June 6, 1939.                R. M. SMITH                    2,161,435
                   ANTENNA SYSTEM FOR MOTOR VEHICLES
                      Filed May 31, 1935          2 Sheets-Sheet 1
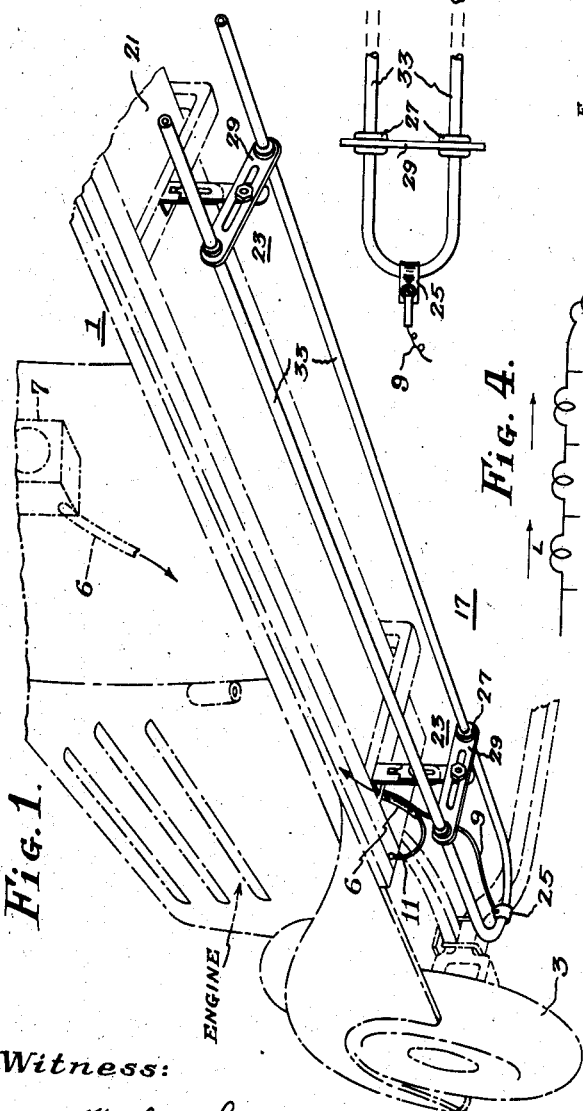
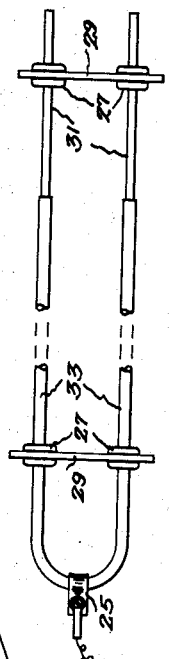
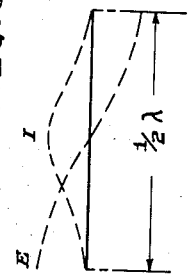
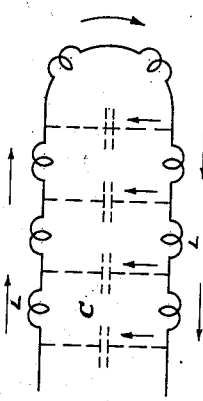
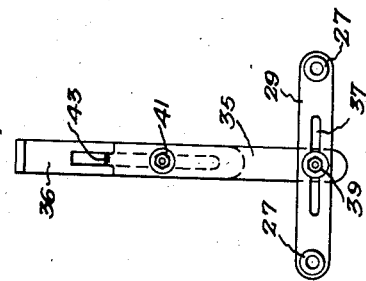
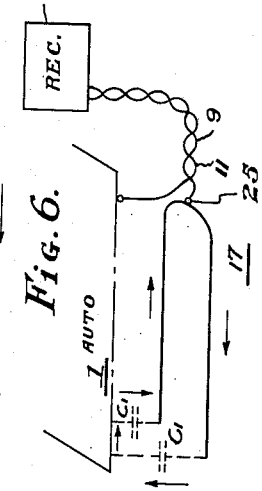
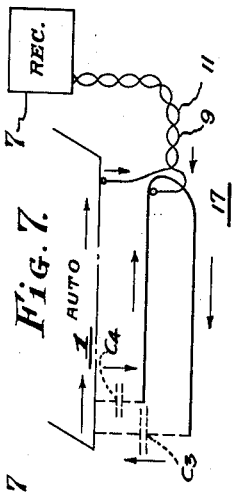
Witness:
F. J. Harbaugh.
INVENTOR
Rogers M. Smith
BY J. R. Goldsborough
ATTORNEY June 6, 1939.  R. M. SMITH  2,161,435
ANTENNA SYSTEM FOR MOTOR VEHICLES
Filed May 31, 1935  2 Sheets-Sheet 2
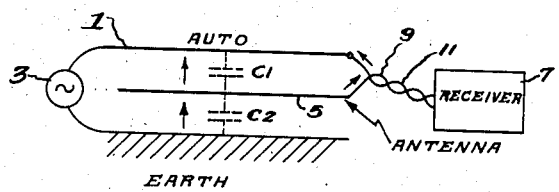
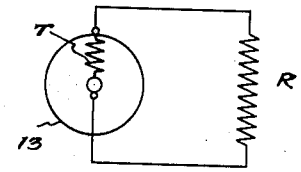
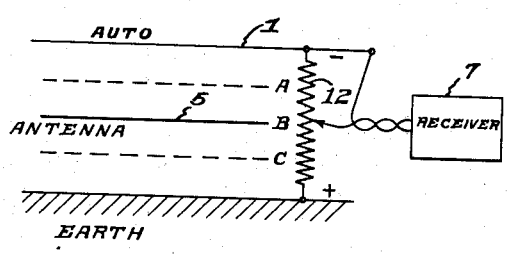
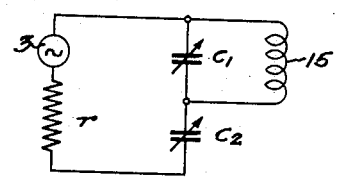
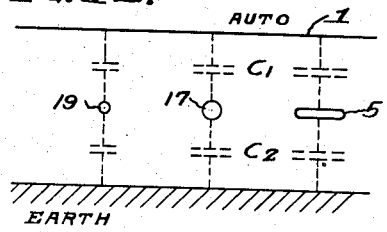
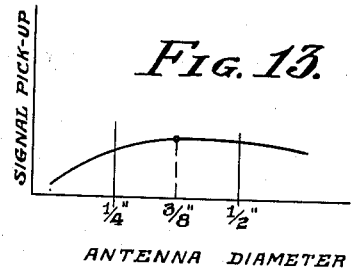
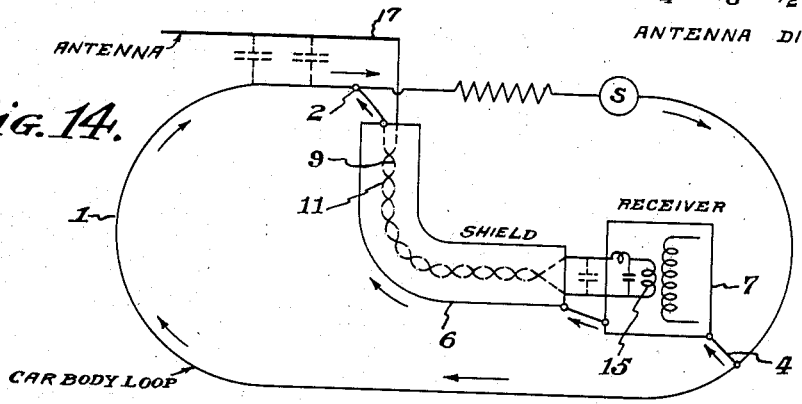
Witness:
F. J. Harbaugh
INVENTOR
Rogers M. Smith
BY R. Goldsborough
ATTORNEY Patented June 6, 1939

2,161,435

UNITED STATES PATENT OFFICE 2,161,435

ANTENNA SYSTEM FOR MOTOR VEHICLES

Rogers M. Smith, Merchantville, N. J., assignor to Radio Corporation of America, a corporation of Delaware Application May 31, 1935, Serial No. 24,234

6 Claims. (Cl. 250—33)

The present invention relates to antenna systems and more particularly to an antenna adapted for use on motor driven vehicles. This application is a continuation in part of my application, Serial No. 759,629, filed December 29, 1934, Patent No. 2,071,858, dated February 23, 1937, and assigned to Radio Corporation of America.

In the early developments of radio receiving apparatus for installation on automobiles, it was found that an antenna mounted in the roof of the automobile gave better results than other arrangements. The roof antenna, however, did not distinguish between the pickup of signals and interference, such as ignition disturbance, and this has lead to considerable experimentation to determine whether ignition interference could be reduced by certain arrangements of the antenna and ground connections as well as by the design of the antenna per se. A substantial advance in the reduction of ignition interference was made by Perkins, Patent No. 1,943,394, who taught that the ground-connection to the car frame should be taken from a point closely adjacent the antenna connection to the lead-in, and that the leads from the ground and antenna to the receiver should be protected, as by twisting and shielding, for the reduction of interference pickup. With the advent of all-steel roof automobiles the shielding caused by the roof prohibits the use of a roof antenna. This has necessitated new developments in under-car antennas. I am aware of the fact that a metal plate has been mounted under car chassis for use as an antenna, this having been used with the RCA-Victor automobile radio Model M-30.

An object of my invention is to provide an antenna for automobiles, or other vehicles, particularly for the elimination of ignition interference.

Another object of my invention is to provide a novel antenna, or counterpoise, of durable and sturdy construction for mounting underneath the chassis of an automobile.

Another object of my invention is to provide an antenna for use with a radio receiver working on long waves, and which is adapted to neutralize the pickup of short wave interference.

The novel features which I consider characteristic of my invention are set forth with particularity in the appended claims. The invention itself, however, both as to its organization and its method of operation, together with additional objects and advantages thereof, will best be understood from the following description of specific embodiments thereof when read in connection with the accompanying drawings, like reference characters referring to similar parts in the different figures, and in which:

Figure 1 is a view in isometric of my novel antenna and mountings, shown mounted underneath a running board of an automobile, the latter shown in dot-dash lines, Fig. 2 is a plan view of one of the mounting brackets for the antenna made in accordance with my invention, Fig. 2a is a view in perspective of a modified form of mounting means for my antenna, Fig. 3 is a plan view, broken in part, of a modified form of my novel antenna structure, Fig. 4 is an electrical circuit diagrammatically representing the electrical characteristics of my dipole antenna, Fig. 5 is a development diagram of the antenna straightened out, with wave energy characteristics shown in dotted lines, Fig. 6 is an electrical diagram with parts in perspective for illustration of the action of the antenna, Fig. 7 is an electrical diagram with parts in perspective for illustrating an unbalanced action that would occur with certain connections, and Figs. 8–14, inclusive, are simplified diagrams drawn to illustrate certain principles underlying my invention.

Referring to my parent application, above referred to I disclosed my new U-shaped rod antenna mounted underneath the running board of an automobile in combination with a novel lead-in system and filter to the input of a radio receiver for the reduction of interference. While I have referred to the U-shape device as an antenna, it may be considered a counterpoise, the car acting as the antenna. This prior application had to do more with the antenna input-filter circuit and the combination with my antenna.

In accordance with my present invention I have found that the antenna, disclosed in the above mentioned application, also shown in design application, Serial No. D-54507, filed December 19, 1934, has inherent and unusual characteristics adapted to the elimination of ignition interference. The theory in explanation of the phenomenal action of the antenna is that its total length is approximately one-half wave length of the predominating interference waves produced by the ignition system, and the antenna is so tuned that standing waves and harmonics exist thereon. The antenna may be regarded as a dipole folded back on itself about a point equidistant from the ends whereby voltage and current distribution on either side or leg of the U is out of phase by approximately 180 degrees with respect to the distribution pattern about the other side of the U. By connecting the lead-in at the equidistant point, short wave interference picked up by the antenna is effectively neutralized. I do not desire to be restricted to the above theory of operation since more extensive investigations may show that my novel results are caused by some quite different phenomena. Furthermore, I do not wish to be limited to my particular U-shape rod structure since it will be obvious to those skilled in the art that other structures can be devised to perform the desired results within the spirit and scope of my invention.

In order to more fully appreciate the nature of the problem of overcoming ignition interference, the following discussion is given about investigations made by me with the help of my associates. In the automobile ignition system, breaker points make and break the primary ignition circuit in accordance with the rotation of the engine. The ignition coil is a step-up transformer having a step-up ratio of about 1:2000 whereby 6 volts change in the primary coil causes a voltage of about 12,000 across the secondary. This secondary high voltage is distributed to the spark plugs through the distributor as the breaker points open and close, making and breaking the primary circuit of the ignition coil. The sudden flow of current in the primary causes a voltage wave of highly irregular form to be built up across the secondary. This high voltage causes a discharge of current in the spark plugs for ignition and it has been observed that the discharge is of an oscillatory, and highly damped or disruptive nature, and therefore a fruitful source of disturbance. The breaker points are actuated once for each cylinder every second revolution of the engine. A six cylinder car with the engine turning over 2000 R. P. M. gives 100 arc discharges per second. This 100 cycle frequency, however, is not the most serious cause of radio disturbance.

Each high tension lead in the ignition system has inductance and capacity to the car body, thereby setting up an oscillatory circuit which radiates energy for each spark discharge. The fundamental frequency of the energy depends upon the length of the ignition wires and their position in relation to adjacent metallic bodies. The high voltage currents from the coil radiate high frequency energy which is picked up by the low voltage light wires, car body, etc., by induction. When roof antennas are used, it has been found that the dome light wire causes considerable trouble because of its close proximity to the antenna. In connection with the radiated high frequency energy induced into the car body, the wave length may be only a few meters long thereby causing standing waves to appear in the car body.

It has been found that high frequency voltages are large at some points of the car body and negligble at other points. Measurements of frequency distribution differed greatly from car to car because of the arrangement of the ignition system and the length of the high voltage wires. We have measured the high frequency energy on a number of cars and found it to be of different wave lengths, as low as a few meters in length, being, in general, particularly bad in the neighborhood of 10 meters. Interference has been observed to be serious on all of the short wave bands, for example from 49 meters down as low as 3 meters, although relatively small in the broadcast and long wave ranges. Reference is made to Radio Review, British, J. Robinson on "The Elimination of Magnetic Disturbance", of December 1919, pages 105-111. Robinson found that the disturbance was bad around 10 to 15 meters, and discusses balancing and shielding methods for reducing interference. The interference that has been observed on broadcast sets is caused by indirect pickup, or secondary effects, arising by reason of the disruptive nature of the discharge above referred to.

There have been found to be three ways whereby energy radiated by the ignition system causes disturbance in a radio receiver on a car; (1) the antenna and ground lead-ins, a special source of trouble; (2) the control cables, battery leads, pilot light wiring, constituting external cables wherein voltages have been induced and in turn conveyed to the receiver; (3) through openings in the usual metal case of the radio receiver chassis, and by means of circulating currents set up in the casing.

The third problem has been solved by covering vent holes in the chassis with wire screen welded to the case, thereby minimizing induced currents entering the receiver. For the prevention of circulating currents as a source of pickup, the radio chassis has been subdivided and a portion, including condensers, R. F. stage, oscillator and first detector coils, are mounted on a sub-panel which is connected to the main chassis base at one point only. This feature is covered in Patent No. 2,087,073, which issued July 13, 1937, on application, Serial No. 24,233, filed May 31, 1935, and assigned to Radio Corporation of America.

In connection with the second problem, certain of the leads entering the receiver casing, including the pilot light lead and speaker leads, have been shielded with metallic braid to exclude a high frequency pickup. The A battery leads have been provided with filters in the receiver to remove any disturbance which may have been picked up from the car wiring, the filter being designed to exclude both low and high frequency disturbances.

In connection with the first mentioned problem, about which my present invention is more particularly concerned, the antenna input system comprises three portions; (a) the antenna per se; (b) the lead-ins; (c) the input circuit to the receiver.

Referring to Fig. 14, the relation between the antenna, automobile body, the shielded lead-in system and the source of ignition interference has been illustrated. The ignition interference generated by the ignition system S circulates in the car body in the manner indicated by the arrows. The lead-in system used between my antenna and the receiver comprises a pair of twisted or transposed conductors 9 and 11 completely shielded to prevent pickup on the transmission line to the receiver. As disclosed in my original application, the primary 15 of the antenna transformer, and the lead-in conductors thereto are not grounded to the radio receiver chassis or housing, the only ground being at a remote point adjacent the antenna. Circulating currents caused by ignition interference flow through the ground lead 4 to the radio receiver case 7 then through the transmission line shield 6 to the car body to a ground point 2 near the antenna. Circulating currents are, therefore, eliminated from the primary of the receiver coupling transformer, and the only ignition interference that is possible to pick up is the source of interference which is capacitively coupled to the antenna from the car body, a problem concerning my present invention.

Referring to Fig. 8, there is shown diagrammatically an automobile body 1 placed a certain distance above earth. Broadcast signals induce a voltage into the automobile as a flat top antenna, and, because of the capacity from car body to earth, cause a capacity current to flow. This voltage is represented by the alternator 3 shown at the left. If a plate 5 is placed between the car 1 and ground and a receiver 7 is connected, through lead-ins 9 and 11, from the plate to car, as shown, the capacity current from earth to plate will have two paths to the car body: (1) through plate-car capacity C1, which is the direct path but of high impedance; (2) through plate to receiver and thence to auto. This is a parallel path to the plate-car capacity path. The portion of the current which flows through the receiver to the car body depends on the relative impedance of the two paths. If the plate is near the earth, the capacity reactance, or impedance, from plate to car is high and most of the current will pass through the receiver. If the plate is near the car, the impedance from plate to car is small and little current will pass through the receiver. This action is that of a capacity voltage divider or potentiometer, and the signal energy picked up by the receiver will vary inversely as the capacities C1 to C2.

Fig. 9 shows its similarity to an ordinary resistance potentiometer: If the plate 5 is in position B, it is the same as though the contact arm of a potentiometer 12 were in the center and the voltage across the receiver is about one-half of the total available voltage; if the plate is moved to position A, the effect is analogous to moving the potentiometer arm upward toward the car body, giving less voltage across the receiver than for position B; if the plate is moved to position C, the effect is equivalent to moving the potentiometer arm downward toward the earth, giving more voltage across the receiver than either position A or B.

It will thus be seen that the lower the antenna the greater will be the signal energy picked up. However, because of the road clearance necessarily required for the antenna, I have found in practice that four inches is about the maximum distance downward from the running board that it can be safely installed. If desired, means may be provided to readily adjust the height of the antenna. Excellent radio signal pickup may be had by dropping it to the ground when standing still and raising it just enough to clear the road when driving.

Referring to Fig. 1 of the drawings, I have shown an antenna pickup 17 made in accordance with my invention and mounted beneath an automobile running board 21, usually of metal, by means of mounting two brackets 23, also made in accordance with my invention. The antenna is preferably made from a tube, as of iron or steel, for sake of low price, and bent into the form of a U. Of course, other material, e. g. copper, or certain alloys, may be used. The diameter of the tube, length and spacing of the sides 33 of the U have all been determined from my experiments to give the best results in accordance with my invention. In an actual example of an antenna that I have designed and built, the outside diameter of the tubing was $\frac{7}{8}$ inches, the spacing between the sides 33 five inches and the overall length from the free ends to the bottom of the U about four feet. An antenna connector 25 for the lead-in 9, is made at the bottom of the U substantially equidistant from both ends for reasons which will be hereinafter given.

The antenna is mounted as by means of the two brackets 23 preferably underneath the running board for the reason that such an installation is quite easy and permits the antenna to be adjusted after its installation to provide proper road clearance. Electrical insulation is provided by rubber grommets 27 carried by apertures in a spreader bar 29 of the brackets 23, shown in greater detail in Fig. 2, for insulating the antenna from all metal bodies. Additional insulation is obtained by protecting the antenna itself, first by a baked enamel coating applied over the surface of the antenna, and secondly, by dipping the complete antenna in a special wax used in transformers and condensers. Prior to the coating, the antenna is preferably copper plated to reduce electrical resistance. These steps not only increase the insulation but prevent corrosion, particularly in areas near salt water. As a further precaution against corrosion the iron tubing may be primarily treated against rust by a certain well known process. The bracket is probably also enameled and waxed to increase insulation.

Where greater protection from the elements is desirable from the viewpoint of electrical insulation and physical protection, I have found it advantageous to provide a coating of rubber over the entire antenna structure and the spreader of the mounting bracket. In one case the structure was gum-dipped, whereby a firmly adherent coating of rubber was formed. In another case a snug fitting rubber tubing was slipped over the antenna rod or tube with the aid of compressed air. This rubber coating is to be preferred except that the cost is higher.

Investigations on under-car antennas have led me to make experiments to determine the factors governing antenna dimensions, etc. to produce the most satisfactory signal pickup qualities. Fig. 10 shows a battery cell 13 having a certain internal resistance $r$, connected across an external resistance R. Maximum power (watts) is developed in the load resistance when the value of the external resistance is equal to the value of the internal resistance. For a lower external resistance, the current increases but the voltage across the resistance decreases. For a higher external resistance, the current decreases and the voltage across the resistor increases. The power developed in either case is not as much as when the external and internal resistances are equal.

In Fig. 11 is represented the circuit of an under-car antenna. The condensers C1 and C2 correspond to C1 C2 in Fig. 8. The inductance coil 15 represents the primary of a receiver coupling transformer. The problem is to design the size of the antenna plate or rod (i. e. determine the correct value for C1 and C2) so as to deliver maximum power from source 3, having an internal resistance $r$, to the receiver. If these condensers are small in size (a small conductor has small capacity to car and ground), their impedance will be high, and most of the voltage will be across C2, since the primary 15 of the receiver coupling transformer is in parallel to C1, which lowers the impedance of C1. If the values of the condensers are large (i. e. a large plate or rod), their impedance is low and C1 substantially short circuits the receiver.

In Fig. 12 is shown a large plate 5 having large capacity C1 and C2 to auto and earth; a medium size rod 17 having smaller capacity to auto and earth than the plate; and a small wire 19 having very small capacity to auto and earth. These different capacity sizes indicate the effect of varying the capacities C1 and C2 in Fig. 11.

In Fig. 13 is a curve showing signal pickup voltage obtained with different size rods. For small size rods, the signal pickup is small because of less effective antenna area. For large size rods, signal pickup decreases because of the low impedance from the rod to auto body, bypassing a large portion of the signal. I have chosen the size that gives best signal pickup, although the dimensions are not critical. It will be clearly seen that any dimension will not give satisfactory results, and I have shown that there is an optimum value, in accordance with my invention, that is productive of efficient results.

In Fig. 4 I have represented the distributed inductance about the dipole antenna by inductance units L, and the distributed capacity between the two sides by capacities C. The antenna, essentially a folded dipole with arms coextensive, is broadly resonant to a frequency, e. g. around seven meters, at which serious ignition interference occurs. Energy at this frequency, induced in the antenna, will set up oscillating currents in the resonant circuits formed by the inductance and distributed capacities, as indicated by the arrows.

Referring to Fig. 5 I have represented my dipole type antenna as being straightened out to illustrate the voltage and current distribution that exists on a half-wave length antenna. It will be seen that the resultant standing waves produce high voltages of opposite polarity at the ends and maximum current at the center, as shown by curves E and I, respectively, in dash lines.

Referring to Fig. 6, the antenna 17 is shown in its folded back dipole position with a receiver connected between the center of the dipole antenna and to the car body. I have found that if the antenna is symmetrically located with respect to the car, for example substantially parallel with the running board if of metal, the capacity C1 from each arm of the dipole to the car will be substantially equal. The disturbing high frequency current flowing to the car from one antenna arm will be equal and opposite to that flowing from the car to the other antenna arm. As a result these circulating interfering currents will not flow through the receiver but are neutralized in the antenna itself. While I have illustrated the capacities C1 and C1 at the ends of the dipole antenna where the highest potential exists, it will be understood that capacity exists between the car and the antenna throughout the length of the antenna.

Referring to Fig. 7 the magnitude of the effect of the balancing out action of this dipole can be diminished by moving the lead-in off of center to a position as shown. Since the lead to the receiver is moved off the center of the dipole, the voltages on the sides or arms of the dipole are no longer balanced; the capacity C3 from one antenna arm to car body is larger than the capacity C4 from the other arm. The difference current will then flow through the receiver since all of the circulating current from the longer electrical side cannot return to the shorter side through the smaller capacity coupling. This results in objectionable noise in the receiver. While in most installations, it has been found desirable to mount the dipole antenna in a plane parallel to the running board for minimum noise pickup, it has been found desirable in some cases of irregular distribution of adjacent metallic bodies, to rotate the plane on the mounting bracket at an angle to the running board.

Referring to a modification in Fig. 3, I have provided means for variable adjustment in the length of the dipole antenna in order to obtain optimum results in the neutralizing of ignition interference. It has been found that the fundamental frequency interference band differs with different cars, particularly with cars where the ignition wires, etc. are of widely different sizes, with the result that the natural interference frequency differs. In the apparatus that I have built I have used a "trombone" type of sliding arrangement. A sliding metallic rod 31 was telescoped in snug fitting relation within the bore of each end of the arms 33 of the U-shape dipole. At the time of installation the rods should be adjusted in and out until the desired interference balance is obtained. In some cases it may be desirable to adjust the arms of the antenna to different lengths. When this is done it will be unnecessary to rotate the plane of the antenna as above outlined. It is also possible to obtain similar effects in regard to balance by shifting the lead-in attachment clamp 25 a certain amount to either side of the center position shown.

While I have illustrated my invention in connection with a U-shape rod, it is obvious that a pair of flexible conductors may be stretched side by side in substantially parallel spaced relation and connected at adjacent ends to the lead-in. In the matter of illustration, the arms 31 of Fig. 3 may be regarded as the parallel conductors, and the member 33 as means for connecting adjacent ends of the conductors. I have not found the parallel relation to be critical and it is possible that considerable variation can be made from that shown without departing from my invention.

The details of the mounting bracket have been illustrated in Fig. 2, wherein the spreader arm 29 is supported by a vertically disposed bar 35, 36 and is provided with a pair of openings at both ends to receive the rubber grommets 27. Centrally the arm is provided with a longitudinal slot 37 for lateral adjustment of the position of the antenna. The lower end of bar 35 is provided with a bolt 39 for engaging the spreader arm about the slot. The vertical bar of the bracket is divided into two sections 35 and 36, held together with a bolt 41 in slidable or overlapping relation. A finger 43 at the upper end of arm portion 35 is provided to prevent relative rotation between the arm sections, although in some cases it is desirable to permit such rotation by lifting the finger out of the slot and allowing it to overhang the edge of the arm. The upper end of the arm section 36 is adapted to be attached to the underneath side of the running board by any suitable means.

Referring to Fig. 2a, where adjustability is not necessary or desirable, I have found that a block of resilient material, as of rubber, with holes at 28 for receiving and supporting the antenna arms, may be used instead of the metallic bracket. This has the advantage of better insulation and greater flexibility in case of striking of obstructions on the road. The upper end of the block is provided with any suitable means such as holes 30 for mounting.

While I have disclosed the antenna as mounted underneath the running board of an automobile, it can be mounted elsewhere, e. g. underneath the chassis of the car between the running boards. My invention is not intended to be restricted to antenna systems on automobiles. My antenna can be used, for example, on aeroplanes with similar advantages, although it may be used in a different form. If greater signal pickup is desired a plurality of antennas may be employed, e. g. one unit under each running board of an automobile and each connected to a radio receiver. While for convenience I have referred to my antenna structure as of U-shape I do not intend this to be a limiting term since there are numerous departures from this specific shape that are within the spirit of my invention.

I have preferred to show my antenna installed under the automobile with the closed ends of the antenna conductors near the engine of the car and the free ends remote therefrom, however, it is obvious that the reverse arrangement could be employed. One advantage, inter alia, of my preferred arrangement is that the radio receiver is generally installed in the front of the car, and the lead-in cable or transmission line from the electrical center of the antenna to the receiver is considerably and advantageously shorter than would be possible with the other arrangement suggested.

I claim as my invention:

1. An antenna for use on an automobile with a radio receiver, comprising a folded linear conductor with arms coextensive, means for insulatingly mounting said conductor on said automobile, and a lead-in connected to said antenna for operating same as a capacity type for receiving relatively long waves, the connection being at a point of electrical balance for neutralizing short-wave interference in said antenna.

2. In combination with an automobile having metal running boards of a U-shape antenna and means for mounting said antenna underneath a running board and in a plane substantially parallel therewith, and a lead-in connected to said antenna for operation as a capacity type for receiving long wave signals, said connection being at a point of electrical balance for reducing ignition interference.

3. An antenna system for a radio receiver installed adjacent a source of electrical disturbance of high frequency nature, comprising a two-arm antenna structure, said structure being of such dimensions as to have a natural period for the development thereon of standing waves caused by short wave radiation from said source, and means for connecting said receiver to a point on said structure where the potential of said standing waves is a minimum.

4. An antenna comprising two arms responsive to short wave interference, means for using said antenna as a capacity antenna for receiving long waves, said means being connected to said arms in balanced relation to cause said short waves to neutralize within said antenna for the prevention of said interference reception.

5. In combination with an antenna for radio receivers on vehicles, said antenna including a pair of parallel spaced coextensive rods, means for adjustably mounting said antenna underneath said vehicle comprising a bracket for supporting the antenna a desired distance beneath said vehicle, said bracket including a spreader arm engaging at its ends said spaced rods, and a bar of adjustable effective length attached at one end to said spreader arm in adjustable relation thereto, and provided at its other end with means for fastening to said vehicle.

6. The combination with a radio receiver installed on a motor driven vehicle of a folded two-arm antenna, a lead-in connecting said receiver to said antenna at substantially its electrical center, means for mounting said antenna underneath said vehicle with said center adjacent the motor and with the free ends of said antenna remote from said motor.

ROGERS M. SMITH.